United States Patent
Khasawneh

(10) Patent No.: US 12,060,118 B2
(45) Date of Patent: Aug. 13, 2024

(54) ELECTRIC POWER STEERING LUMPED PARAMETERS ESTIMATION USING VECTOR TYPE RECURSIVE LEAST SQUARES METHOD WITH VARIABLE FORGETTING FACTOR

(71) Applicant: Lubna Khasawneh, Rochester Hills, MI (US)

(72) Inventor: Lubna Khasawneh, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 288 days.

(21) Appl. No.: 17/739,327

(22) Filed: May 9, 2022

(65) Prior Publication Data

US 2023/0356771 A1 Nov. 9, 2023

(51) Int. Cl.
*B62D 5/04* (2006.01)
*B62D 5/00* (2006.01)
*G06F 17/17* (2006.01)

(52) U.S. Cl.
CPC ........... *B62D 5/0472* (2013.01); *B62D 5/005* (2013.01); *G06F 17/17* (2013.01)

(58) Field of Classification Search
CPC ...... B60W 30/08; B60W 10/20; B60W 10/30; B60W 40/04; B60W 40/08; B60W 50/14; B60W 2040/0818; B60W 2050/143; B60W 2050/146; B60W 2540/30; B60W 2554/00; B60W 2556/10; B60W 2710/0605; B60W 2710/182; B60W 2710/202
See application file for complete search history.

(56) References Cited

U.S. PATENT DOCUMENTS

| | | | |
|---|---|---|---|
| 6,756,757 B2 | 6/2004 | Marcinkiewicz et al. | |
| 7,848,864 B2 | 12/2010 | Huang | |
| 8,175,771 B2 | 5/2012 | Ukai et al. | |
| 10,300,940 B2 * | 5/2019 | Tsubaki | H02P 29/0241 |

OTHER PUBLICATIONS

International Search Report and Written Opinion dated Aug. 18, 2023 for International Application No. PCT/US2023/066581, International Filing date May 4, 2023.

(Continued)

*Primary Examiner* — Jacob M Amick
*Assistant Examiner* — Charles J Brauch
(74) *Attorney, Agent, or Firm* — Jeremy J. Klobucar

(57) ABSTRACT

Control systems and methods for an electric power steering (EPS) system of a vehicle include obtaining, by a controller of the vehicle and from a set of sensors, a set of parameters of an electric motor of the EPS system, the EPS system further comprising a steering column and a steering wheel, and controlling, by the controller, the EPS system by based on the set of measured parameters of the electric motor, performing vector type recursive least squares estimation (RLSE) of a plurality of lumped EPS parameters including applying a variable forgetting factor, generating steering angle torque commands based on the estimated plurality of lumped EPS parameters, and controlling the electric motor of the EPS based on the generated steering angle torque commands for more accurate control of a trajectory of the vehicle.

18 Claims, 3 Drawing Sheets

(56) References Cited

OTHER PUBLICATIONS

Lin Wen-Chiao et al: "Model-Based Fault Diagnosis and Prognosis for Electric Power Steering Systems", 2026 IEEE International Conference on Prognostics and Health Management (ICPHM), IEEE, Jun. 20, 2016 (Jun. 20, 2016), pp. 1-9, XP032945060, DOI: 10.1109/ICPHM.2016.7542840 [retrieved on Aug. 12, 2016], p. 2, left-hand column, line 14-p. 4, left-hand column, line 10.
Nguyen, Van Giao, "Parameter Estimation, Robust Controller Design and Performance Analysis for an Electric Power Steering System", Algorithms 2019, 12,57; doi:10.3390.

* cited by examiner

ELECTRIC POWER STEERING LUMPED PARAMETERS ESTIMATION USING VECTOR TYPE RECURSIVE LEAST SQUARES METHOD WITH VARIABLE FORGETTING FACTOR

FIELD

The present application generally relates to vehicle electric power steering (EPS) control and, more particularly, to techniques for EPS lumped parameters estimation using a vector type recursive least squares estimation (RLSE) method with a variable forgetting factor.

BACKGROUND

Electric power steering (EPS) involves a set of electric motors that are controlled by generated torque commands to steer a vehicle. Conventional EPS is provided by a supplier as a "black box," i.e., the modeling parameters are unknown. While this approach generally works well, it leaves something to be desired for application-specific adjustments. Thus, an original equipment manufacturer (OEM) is required to estimate these parameters if any adjustments to the generic EPS control are desired. Conventional EPS parameter estimations utilize a recursive least squares estimation (RLSE) with a single forgetting factor for all parameters. This conventional approach is less than ideal because every parameter changes at a different rate and a constant forgetting factor also suffers from slow convergence to the parameter real value. Accordingly, while such conventional EPS systems do work well for their intended purpose, there exists an opportunity for improvement in the relevant art.

SUMMARY

According to one exemplary aspect of the invention, a control system for an electric power steering (EPS) system of a vehicle is presented. In one exemplary implementation, the control system comprises a set of sensors configured to measure a set of parameters of an electric motor of the EPS system, the EPS system further comprising a steering column and a steering wheel, and a controller configured to control the EPS system by: obtaining the measured set of parameters of the electric motor of the EPS system from the set of sensors, based on the measured set of parameters of the electric motor, performing vector type recursive least squares estimation (RLSE) of a plurality of lumped EPS parameters including applying a variable forgetting factor, generating steering angle torque commands based on the estimated plurality of lumped EPS parameters, and controlling the electric motor of the EPS based on the generated steering angle torque commands for more accurate control of a trajectory of the vehicle.

In some implementations, the vector type RLSE is defined by a second order system with the plurality of lumped EPS parameters. In some implementations, the lumped EPS parameters comprise a moment of inertia of the EPS system, a damping of the EPS system, and a coulomb friction constant of the EPS system. In some implementations, the EPS system further comprises a rack and pinion connected to the electric motor and to the steering column and the steering wheel via a torsion bar spring, and wherein the moment of inertia of the EPS system comprises separate inertias of (i) the steering wheel and the steering column and (ii) the electric motor and the rack and pinion, and wherein these separate inertias are separated by the torsion bar spring. In some implementations, the separate inertias of the EPS system are lumped together for form the single moment of inertia of the EPS system.

In some implementations, applying the variable forgetting factor comprises: initializing a regression vector and a covariance matrix, calculating the regression vector based on measured system output and an input vector, calculate an identification error based on the calculated regression vector, and update the variable forgetting factor based on the calculated identification error. In some implementations, applying the variable forgetting factor further comprises: updating a gain vector, updating the covariance matrix, and updating a parameter estimate vector defining the estimated plurality of lumped EPS parameters. In some implementations, the measured set of parameters comprises torque, angular velocity, and angular acceleration of the electric motor. In some implementations, the controller is configured to control the EPS system as part of an autonomous driving feature of the vehicle. In some implementations, the autonomous driving feature of the vehicle is an L3 or L3+ autonomous driving feature.

According to another exemplary aspect of the invention, a control method for an EPS system of a vehicle is presented. In one exemplary implementation, the control method comprises obtaining, by a controller of the vehicle and from a set of sensors, a set of parameters of an electric motor of the EPS system, the EPS system further comprising a steering column and a steering wheel, controlling, by the controller, the EPS system by: based on the set of measured parameters of the electric motor, performing vector type RLSE of a plurality of lumped EPS parameters including applying a variable forgetting factor, generating steering angle torque commands based on the estimated plurality of lumped EPS parameters, and controlling the electric motor of the EPS based on the generated steering angle torque commands for more accurate control of a trajectory of the vehicle.

In some implementations, the vector type RLSE is defined by a second order system with the plurality of lumped EPS parameters. In some implementations, the lumped EPS parameters comprise a moment of inertia of the EPS system, a damping of the EPS system, and a coulomb friction constant of the EPS system. In some implementations, the EPS system further comprises a rack and pinion connected to the electric motor and to the steering column and the steering wheel via a torsion bar spring, and wherein the moment of inertia of the EPS system comprises separate inertias of (i) the steering wheel and the steering column and (ii) the electric motor and the rack and pinion, and wherein these separate inertias are separated by the torsion bar spring. In some implementations, the separate inertias of the EPS system are lumped together for form the single moment of inertia of the EPS system.

In some implementations, applying the variable forgetting factor comprises: initializing a regression vector and a covariance matrix, calculating the regression vector based on measured system output and an input vector, calculate an identification error based on the calculated regression vector, and update the variable forgetting factor based on the calculated identification error. In some implementations, applying the variable forgetting factor further comprises: updating a gain vector, updating the covariance matrix, and updating a parameter estimate vector defining the estimated plurality of lumped EPS parameters. In some implementations, the measured set of parameters comprises torque, angular velocity, and angular acceleration of the electric motor. In some implementations, the controlling of the EPS system by the controller is performed as part of an autonomous driving feature of the vehicle. In some implementations, the autonomous driving feature of the vehicle is an L3 or L3+ autonomous driving feature.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional electric power steering (EPS) parameter estimations utilize a recursive least squares estimation (RLSE) with a single forgetting factor for all parameters (also known as "scalar RLSE"). This conventional approach is less than ideal because every parameter changes at a different rate and a constant forgetting factor also suffers from slow convergence to the parameter real value. As a result, improved EPS systems and methods that utilize a vector type variable RLSE forgetting factor for EPS parameter estimation. This allows for separate tuning of each EPS parameter based on variable rates of change for those particular EPS parameters. In addition, the forgetting factor is time-varying (a function of identification error) to thereby increase the rate of convergence to the parameter real values. The potential benefits include increased EPS performance, i.e., faster and more accurate generation of steering angle torque commands across a wide array of different vehicle applications, including, but not limited to, steering trajectory control as part of an autonomous driving feature (e.g., L3 or L3+) of the vehicle.

Figure 1:
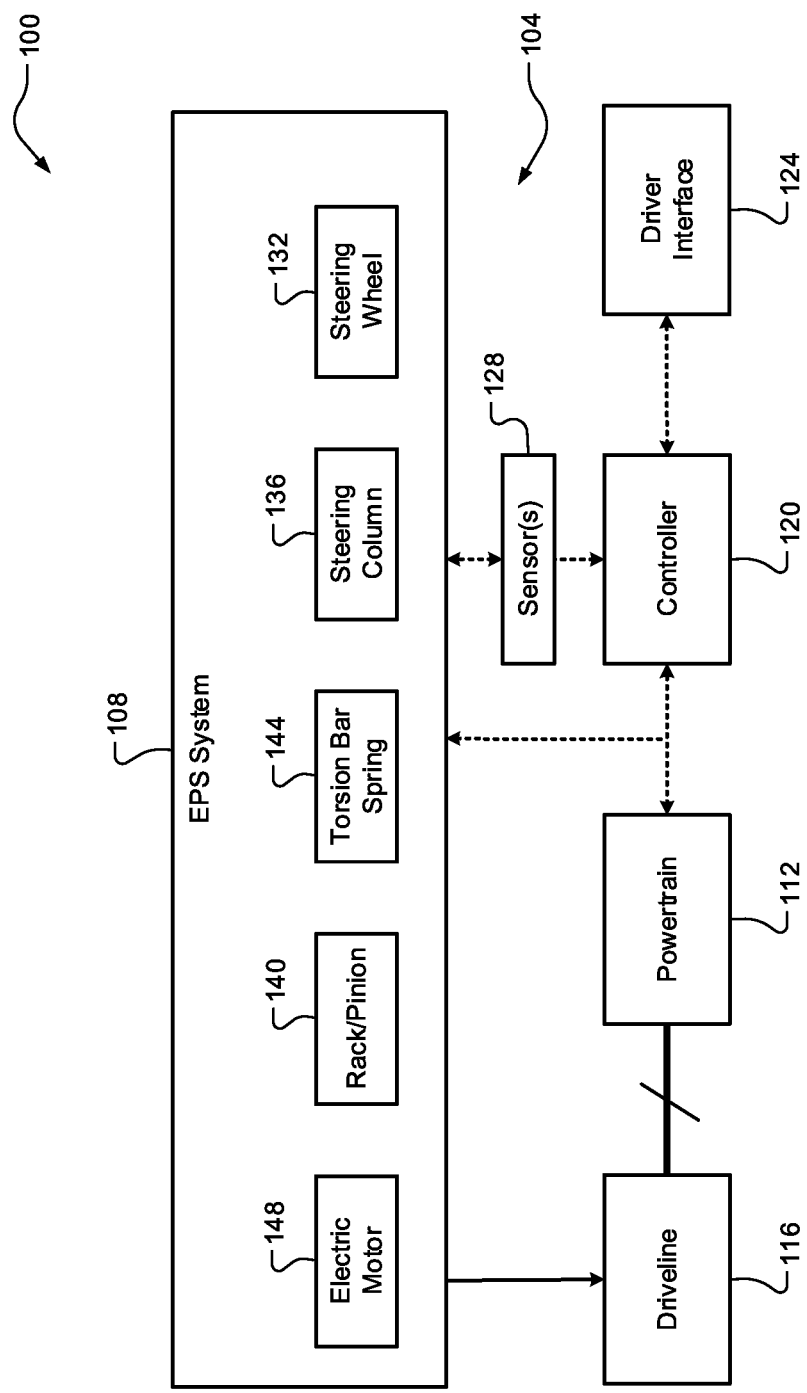
FIG. 1 is a functional block diagram of a vehicle having an example electric power steering (EPS) system according to the principles of the present application.

Referring now to FIG. 1, a functional block diagram of a vehicle 100 comprising an example control system 104 for an EPS system 108 according to the principles of the present application is presented. The vehicle 100 generally comprises a powertrain 112 (e.g., an engine, an electric traction motor, or combinations thereof, and a transmission) configured to generate and transfer drive torque to a driveline 116 for vehicle propulsion. The vehicle 100 comprises a controller 120 that controls operation of the vehicle 100, such as controlling the powertrain 112 to achieve a driver torque request provided by a driver of the vehicle 100 via a driver interface 124. While components of the EPS system 108 are illustrated as separate from the driver interface, it will be appreciated that some components of the EPS system 108 (e.g., a steering wheel) could be part of the driver interface 124. The control system 104 for the EPS system 108 generally comprises the controller 120 and a set of sensors 128.

The EPS system 108 comprises a steering wheel 132 connected to a steering column 136, which is connected to a rack and pinion 140 and the driveline 116 via a torsion bar spring 144. The EPS system 108 further comprises an electric motor 148 connected to the rack and pinion 140 to move such for control of the vehicle's driveline trajectory. The set of sensors 128 primarily are configured to measure a set of parameters of the electric motor 148, but it will be appreciated that the set of sensors 128 could be configured to measure additional other parameters. In one exemplary implementation, the measured set of parameters comprises torque, angular velocity, and angular acceleration of the electric motor 148. Based on the techniques of the present application, the controller 120 is configured to estimate lumped EPS system parameters and generate steering wheel angle commands (for the electric motor 148) to achieve faster and/or more accurate vehicle trajectory control. This control of the EPS system 108 could be, for example, as part of an autonomous driving feature of the vehicle 100 (e.g., an L3 or L3+ autonomous driving feature).

Figure 2:
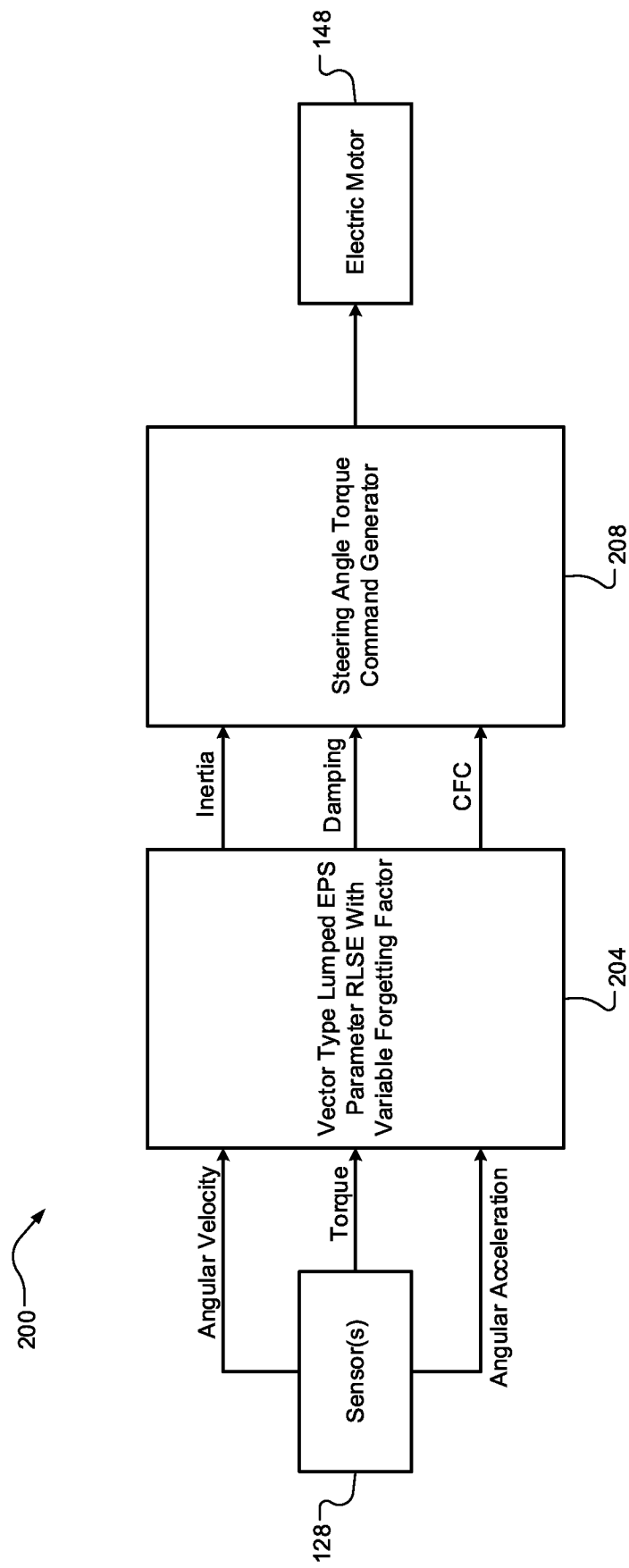
FIG. 2 is a functional block diagram of an example EPS system control architecture according to the principles of the present application.

Referring now to FIG. 2, a functional block diagram of an example architecture 200 for the control system 104 according to the principles of the present application is illustrated. Block 204 receives the measured set of parameters of the electric motor 148 and performs vector type RLSE of the plurality lumped EPS parameters including applying a variable forgetting factor. Block 208 receives the estimated plurality of lumped EPS parameters and generates steering wheel angle commands for controlling the electric motor 148 to achieve a more accurate vehicle trajectory. In one exemplary implementation, the lumped EPS parameters comprise a moment of inertia of the EPS system 108, a damping of the EPS system 108, and a coulomb friction constant (CFC) of the EPS system 108. The moment of inertia of the EPS system 108 comprises separate inertias of (i) the steering wheel 132 and the steering column 136 and (ii) the electric motor 148 and the rack and pinion 140, and wherein these separate inertias are separated by the torsion bar spring 144. These separate inertias of the EPS system 108 are thereby "lumped" together for form the single moment of inertia of the EPS system 108.

In one exemplary implementation, the vector type RLSE is defined by a second order system with the plurality of lumped EPS parameters.

$$\tau_p - \tau_a = J\ddot{\theta} + b\dot{\theta} + F\,\mathrm{sgn}(\dot{\theta}) \tag{1}$$

In a State Space Representation:

$$\begin{bmatrix} \dot{\theta} \\ \ddot{\theta} \end{bmatrix} = \begin{bmatrix} 0 & 1 \\ 0 & -\frac{b}{J} \end{bmatrix} \begin{bmatrix} \theta \\ \dot{\theta} \end{bmatrix} + \frac{1}{J}\begin{bmatrix} 0 \\ \tau_p \end{bmatrix} - \frac{1}{J}\begin{bmatrix} 0 \\ F\mathrm{sgn}(\dot{\theta}) + \tau_a \end{bmatrix}, \tag{2}$$

where $\theta$ represents pinion angle, $\tau_p$ represents pinion torque, $\tau_a$ represents aligning moment, J represents equivalent moment of inertia, b represents equivalent damping, and F represents coulomb friction constant. For example, in order to measure the performance of the EPS system 108, the vehicle 100 could be placed on a hoist to eliminate tire loads. Torque commands could then be fed to the EPS system 108 as a swine sweep with increasing frequency and amplitude and the actual torque and steering wheel angle could be measured. Because the vehicle 100 was placed on a hoist, the aligning moment $\tau_a$ is eliminated from Equation (2) and hence it reduces to:

$$\tau_p = J\ddot{\theta} + b\dot{\theta} + F\,\text{sgn}(\dot{\theta}) \quad (3).$$

In the vector type rlse method, the system equation could be Represented as:

$$y(k) = a^T \phi(k) + e(k) \quad (4),$$

where:

$$\phi(k) = [\ddot{\theta}\, \dot{\theta}\, \text{sgn}(\dot{\theta})] \quad (5),$$

$$a^T = [J\ b\ F], \quad (6), \text{ and}$$

$$y(k) = \tau_p, \quad (7),$$

and e(k) represents the identification error and k represents time. We would like to find the best estimate of a and a that minimizes the cost function:

$$J_{cost} = \Sigma_{i=1}^{k} [y(i) - \hat{a}^T(k)\phi(k-1)]^2 \quad (8)$$

The necessary condition for minima is given by the gradient of the cost function (8) with respect to the estimate vector as follows:

$$\frac{\partial J_{cost}}{\partial \hat{a}} = -2 \sum_{i=1}^{k} [y(i) - \hat{a}^T(k)\phi(k-1)]\phi(k-1) = 0. \quad (9)$$

In one exemplary implementation, applying the variable forgetting factor comprises:
(1) initializing a regression vector a and a covariance matrix P(k);
(2) calculating the regression vector $a^T = [J\ b\ F]$ based on the measured system output $y(k) = \tau_p$ and the input vector $\phi(k) = [\ddot{\theta}\ \dot{\theta}\ \text{sgn}(\dot{\theta})]$;
(3) calculating an identification error e(k) based on the calculated regression vector ($e(k) = y(t) - \hat{a}^T(k)\phi(k-1)$); and
(4) updating the variable forgetting factor (Λ) based on the calculated identification error:

$$\lambda_i(k) = \sqrt{\frac{1}{1 + \frac{g_i e^2(k-1)}{1 + \phi^T(k)P(k)\phi(k)}}}, \quad (10)$$

where $g_i$ is constant for each parameter:

$$\Lambda(k) = \begin{bmatrix} \frac{1}{\lambda_1(k)} & 0 & 0 \\ 0 & \lambda_2(k) & 0 \\ 0 & 0 & \lambda_3(k) \end{bmatrix}. \quad (11)$$

In one exemplary implementation, applying the variable forgetting factor further comprises:
(5) updating the gain vector (K):

$$K(k) = \frac{P(k-1)\phi(k)}{1 + \phi^T(k)P(k-1)\phi(k)}; \quad (12)$$

(6) updating the covariance matrix (P):

$$P(k) = \Lambda(k)\left[\frac{P(k-1)\phi(k)\phi^T(k)P(k-1)}{1 + \phi^T(k)P(k-1)\phi(k)}\right]; \quad (13)$$

and
(7) updating a parameter estimate vector (â(k)) defining the estimated plurality of lumped EPS parameters:

$$\hat{a}(k) = \hat{a}(k-1) + K(k)e(k) \quad (14).$$

Figure 3:
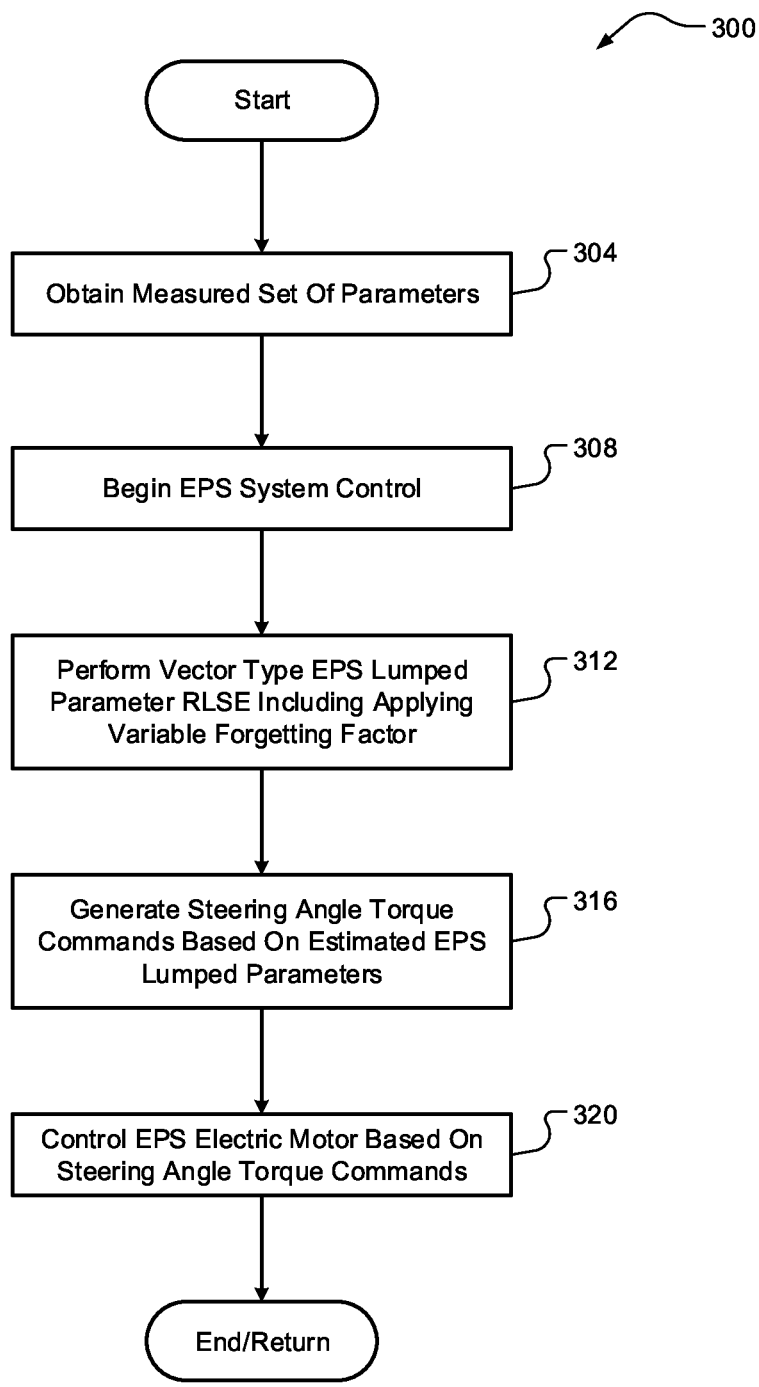
FIG. 3 is a flow diagram of an example EPS control method for a vehicle according to the principles of the present application.

Referring now to FIG. 3, a flow diagram of an example control method 300 for a vehicle EPS system according to the principles of the present application is illustrated. While the control system 104 and EPS system 108 of vehicle 100 are specifically referenced, it will be appreciated that the method 300 could be applicable to any suitable vehicle EPS system. At 304, the controller 120 receives, from the set of sensors 128, the measured set of parameters of an electric motor 148 of the EPS system 108 (e.g., torque, angular velocity, and angular acceleration). At 308, the controller 120 begins control of the EPS system 108. At 312, the controller 120 performs vector type RLSE of the plurality of lumped EPS parameters (e.g., moment of inertia (lumped), damping, and coulomb friction constant) including applying the variable forgetting factor. This could include, for example, the utilization/calculations of Equations (1)-(14) as described above. At 316, the controller 120 generates steering angle torque commands based on the estimated plurality of lumped EPS parameters. Lastly, at 320, the controller 120 controls the electric motor 148 of the EPS system 108 based on the generated steering angle torque commands for more accurate control of a trajectory of the vehicle 100 (e.g., as part of an autonomous driving feature, such as an L3 or L3+ autonomous driving feature). The method 300 then ends or returns to 304 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:
1. A control system for an electric power steering (EPS) system of a vehicle, the control system comprising:
   a set of sensors configured to measure a set of parameters of an electric motor of the EPS system, the EPS system further comprising a steering column and a steering wheel; and
   a controller configured to control the EPS system by:
      obtaining the measured set of parameters of the electric motor of the EPS system from the set of sensors;

based on the measured set of parameters of the electric motor, performing vector type recursive least squares estimation (RLSE) of a plurality of lumped EPS parameters including applying a variable forgetting factor;

generating steering angle torque commands based on the estimated plurality of lumped EPS parameters; and controlling the electric motor of the EPS based on the generated steering angle torque commands for more accurate control of a trajectory of the vehicle.

2. The control system of claim 1, wherein the vector type RLSE is defined by a second order system with the plurality of lumped EPS parameters.

3. The control system of claim 2, wherein the lumped EPS parameters comprise a moment of inertia of the EPS system, a damping of the EPS system, and a coulomb friction constant of the EPS system.

4. The control system of claim 3, wherein the EPS system further comprises a rack and pinion connected to the electric motor and to the steering column and the steering wheel via a torsion bar spring, and wherein the moment of inertia of the EPS system comprises separate inertias of (i) the steering wheel and the steering column and (ii) the electric motor and the rack and pinion, and wherein these separate inertias are separated by the torsion bar spring.

5. The control system of claim 4, wherein the separate inertias of the EPS system are lumped together to form the single moment of inertia of the EPS system.

6. The control system of claim 2, wherein applying the variable forgetting factor comprises:
    initializing a regression vector and a covariance matrix;
    calculating the regression vector based on measured system output and an input vector;
    calculate an identification error based on the calculated regression vector; and
    update the variable forgetting factor based on the calculated identification error.

7. The control system of claim 6, wherein applying the variable forgetting factor further comprises:
    updating a gain vector;
    updating the covariance matrix; and
    updating a parameter estimate vector defining the estimated plurality of lumped EPS parameters.

8. The control system of claim 1, wherein the measured set of parameters comprises torque, angular velocity, and angular acceleration of the electric motor.

9. The control system of claim 1, wherein the controller is configured to control the EPS system as part of an autonomous driving feature of the vehicle, and wherein the autonomous driving feature of the vehicle is an L3 or L3+ autonomous driving feature.

10. A control method for an electric power steering (EPS) system of a vehicle, the control method comprising:
    obtaining, by a controller of the vehicle and from a set of sensors, a set of parameters of an electric motor of the EPS system, the EPS system further comprising a steering column and a steering wheel; and
    controlling, by the controller, the EPS system by:
        based on the set of measured parameters of the electric motor, performing vector type recursive least squares estimation (RLSE) of a plurality of lumped EPS parameters including applying a variable forgetting factor;
        generating steering angle torque commands based on the estimated plurality of lumped EPS parameters; and
        controlling the electric motor of the EPS based on the generated steering angle torque commands for more accurate control of a trajectory of the vehicle.

11. The control method of claim 10, wherein the vector type RLSE is defined by a second order system with the plurality of lumped EPS parameters.

12. The control method of claim 11, wherein the lumped EPS parameters comprise a moment of inertia of the EPS system, a damping of the EPS system, and a coulomb friction constant of the EPS system.

13. The control method of claim 12, wherein the EPS system further comprises a rack and pinion connected to the electric motor and to the steering column and the steering wheel via a torsion bar spring, and wherein the moment of inertia of the EPS system comprises separate inertias of (i) the steering wheel and the steering column and (ii) the electric motor and the rack and pinion, and wherein these separate inertias are separated by the torsion bar spring.

14. The control method of claim 13, wherein the separate inertias of the EPS system are lumped together to form the single moment of inertia of the EPS system.

15. The control method of claim 14, wherein applying the variable forgetting factor comprises:
    initializing a regression vector and a covariance matrix;
    calculating the regression vector based on measured system output and an input vector;
    calculate an identification error based on the calculated regression vector; and
    update the variable forgetting factor based on the calculated identification error.

16. The control method of claim 15, wherein applying the variable forgetting factor further comprises:
    updating a gain vector;
    updating the covariance matrix; and
    updating a parameter estimate vector defining the estimated plurality of lumped EPS parameters.

17. The control method of claim 10, wherein the measured set of parameters comprises torque, angular velocity, and angular acceleration of the electric motor.

18. The control method of claim 10, wherein the controlling of the EPS system by the controller is performed as part of an autonomous driving feature of the vehicle, and wherein the autonomous driving feature of the vehicle is an L3 or L3+ autonomous driving feature.

* * * * *